T. F. CARVER.
Friction-Pulley.

No. 160,570.　　　　　　　　　　　　Patented March 9, 1875.

Witnesses.
Jos. Whitaker
Sam'l M. Barton

Inventor.
Thomas F. Carver
by his Att'ys.
C. D. Wright & Brown

THE GRAPHIC CO.PHOTO-LITH.39 & 41 PARK PLACE, N.Y.

UNITED STATES PATENT OFFICE.

THOMAS F. CARVER, OF WORCESTER, MASSACHUSETTS, ASSIGNOR OF ONE-HALF HIS RIGHT TO JAMES H. GRAY, OF SAME PLACE.

IMPROVEMENT IN FRICTION-PULLEYS.

Specification forming part of Letters Patent No. 160,570, dated March 9, 1875; application filed February 3, 1875.

*To all whom it may concern:*

Figure 1:
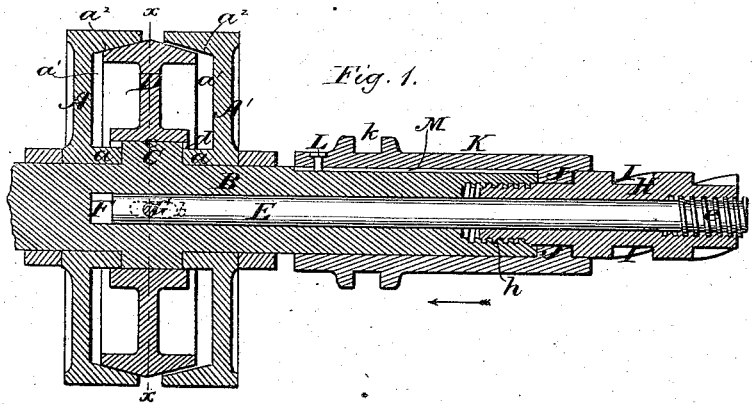
Figure 2:
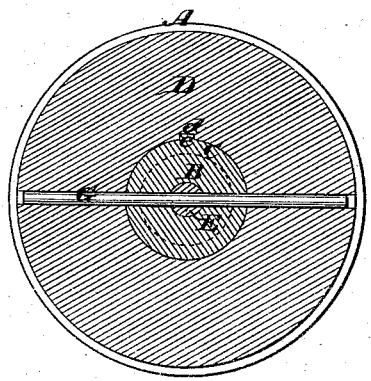
Figure 3:
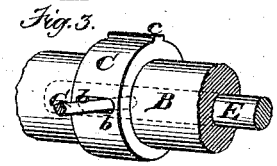
Figure 4:
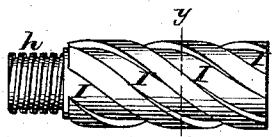
Figure 5:
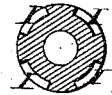
Figure 6:
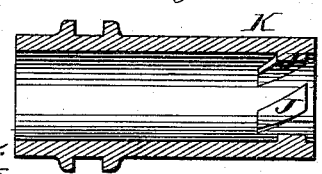
Figure 7:
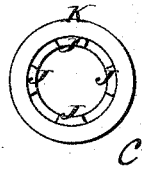

Be it known that I, THOMAS F. CARVER, of Worcester, in the county of Worcester and State of Massachusetts, have invented certain Improvements in Friction-Pulleys, of which the following is a specification:

Figure 1 is a longitudinal section of my invention. Fig. 2 is a section on the plane of line $x\,x$, Fig. 1. Fig. 3 is a perspective view, showing a portion of the shaft on which the pulleys run. Fig. 4 is a side view of the spirally-grooved cylindrical nut detached. Fig. 5 is a section through line $y\,y$, Fig. 4. Fig. 6 is a longitudinal section of the shipping-collar detached, and Fig. 7 an end view of the latter.

My invention relates to that class of friction-pulleys in which either of two loose pulleys, running side by side on one shaft, is locked by a friction ring or clutch rotating with the shaft and sliding longitudinally thereon between the pulleys, so as to operate interchangeably with them, locking one and leaving the other loose.

The object of my invention is to provide improved means for readily effecting the longitudinal motion of the friction ring or clutch, and holding the clutch in firm contact with the pulley with which it is engaged, so as to prevent the contact from being disturbed by the action or jar of the machinery. To these ends my invention consists, first, in a cylindrical rod extending along a longitudinal recess in the center of the shaft on which the pulleys run, and connected by a transverse pin, or its equivalent, with the shaft and the friction-ring, the pin passing through longitudinal slots in the shaft, and serving to connect the ring, the shaft, and the longitudinal rod, so as to insure their unison of rotation, the slots in the shaft allowing the ring and the rod to slide longitudinally thereon. The means consist also in a cylindrical nut, having exterior left-hand threads cut on one end, by which it is screwed into the end of the shaft, and having a longitudinal bore through which the rod before mentioned passes, the outer end of said bore having right-hand screw-threads cut in it, with which engage similar threads cut on the outer end of the longitudinal rod. The periphery of the cylindrical nut is provided with spiral grooves, with which engage spiral lugs or guides on the interior of a shipping-collar which incloses the cylindrical nut, and is adapted to slide longitudinally thereon, the sliding of the collar causing the rotation of the cylindrically-grooved nut, and the latter acting on the threaded end of the longitudinal rod, slides the latter in or out so as to cause the friction-ring, with which it is connected to bear against one or the other of the loose pulleys, all of which I will now proceed to describe.

In the drawings, A A′ represent the pulleys, arranged to turn loosely on the shaft B, side by side, their hubs or collars $a\,a$ being separated by an enlargement, C, on the shaft. The proximate sides of the pulleys A A′ are formed with annular recesses $a^1\,a^1$, the outer circumferences or margins $a^2$ of which are beveled, as shown in Fig. 1. D represents the friction ring or disk, having a bore which fits over the enlargement C of the shaft B, said bore having a groove, $d$, into which projects a spline or key, $c$, formed on the periphery of the enlargement, the ring D being thus connected to the shaft so as to rotate with it, and at the same time be allowed to slide longitudinally on the shaft between the pulleys A A′, sufficient space being provided between the pulleys so that when the ring or disk is in contact with one pulley it does not touch the other. The periphery of the ring or disk D is beveled outwardly from the edges to the center, at an angle corresponding to that of the beveled margins $a^2$ of the recesses $a^1$, thus giving said ring or disk a double-wedge shape in cross-section, as shown in Fig. 1, each wedge-shaped side fitting into the corresponding recess $a^1$ of the loose pulleys, and locking itself by friction to the pulley with which it is in contact.

E is a cylindrical rod, extending into a longitudinal recess or bore, F, in the center of the shaft B. G is a transverse pin extending through the ring or disk D, the shaft B and the rod E thereby connecting these parts, and causing them to rotate together.

The shaft B is provided with longitudinal slots $b$, through which the pin G passes, said slots allowing the pin with the rod and ring or disk the necessary sliding movement on the shaft.

H represents a cylindrical nut, having a left-hand screw-thread, $h$, cut in its inner end, by means of which it is screwed into a correspondingly-threaded socket in the end of the shaft B.

The nut H is preferably of the same diameter as the shaft B, and is provided with a bore corresponding to that of the shaft, and receiving the rod E, as shown in Fig. 1, the rod being provided at its outer end with a right-hand screw-thread, $e$, which engages with a similar thread cut in the end of the bore of the nut H.

The periphery of the nut H is provided with spiral grooves I, with which engage spiral lugs J, formed on the interior of a sliding collar, K, the latter inclosing the shaft B and nut H, and having a groove, $k$, in its periphery to engage with a suitable shipping-lever. The collar K is adapted to slide longitudinally on the shaft B, and is prevented from rotating independently on the shaft by a stud or pin, L, which enters a longitudinal groove, M, in the shaft, and travels therein.

By sliding the collar K along the shaft B and nut H its spiral lugs J, engaging with the grooves I of the nut, produce a rotation of the latter corresponding in direction to the direction in which the collar is moved. Suppose the collar to be moved in the direction of the arrow in Fig. 1—that is to say, toward the pulleys A A'—the nut is rotated toward the left, thereby turning its threaded end $h$ into the shaft B, the nut H being thus advanced slightly toward the pulleys A A', this motion, of course, carrying the rod E with its connections in the same direction, thus moving the ring or disk D toward the pulley A. At the same time the internal thread of the nut H, acting on the right-hand thread $e$ of the rod E, gives the rod an additional movement in the same direction, the result of the two movements being to force the ring or disk D with the necessary degree of pressure into the recess $a'$ of the pulley A, as shown in Fig. 1, thus locking said pulley with the ring D and shaft B, the pulley A' being left loose. To lock the pulley A' it is only necessary to move the collar K in the opposite direction, the operation being the reverse of that above described.

It will be seen that only a slight sliding movement of the ring or disk D is necessary to lock it with either loose pulley, and entirely clear it from the other; hence a very slight rotation of the cylindrical nut is sufficient, producing as it does a compound or double movement of the rod.

It is, of course, necessary to give the longitudinally-moving parts such freedom of longitudinal motion that none of them except the beveled periphery of the ring D shall have an abutment. For this purpose the recess F and the screw-sockets receiving the thread $h$ of the nut H and the thread $e$ of the rod E are made of such depth as to prevent the parts they receive from coming in contact with their inner ends, as shown in Fig. 1.

By means of my invention the tendency of the jar of the machinery to disturb the contact of the friction-ring with the pulley with which it is engaged is entirely obviated.

I claim as my invention—

The combination of the cylindrical nut H, having spiral grooves I and exterior and interior threaded portions, the collar K, having internal spiral lugs J, the recessed shaft B, having the slots $b$, and the rod E, having the threaded outer end $e$, the inner end of said rod being connected by the pin G, or its equivalent, with a sliding friction or other locking device rotating with the shaft B, and adapted to be locked with a loose pulley or pulleys on said shaft, substantially as specified.

In testimony whereof I have signed my name to this specification in the presence of two subsribing witnesses.

THOMAS F. CARVER.

Witnesses:
ABIEL E. WILSON,
WM. S. TAYLOR.